United States Patent
Nerurkar et al.

(10) Patent No.: US 9,940,542 B2
(45) Date of Patent: Apr. 10, 2018

(54) MANAGING FEATURE DATA FOR ENVIRONMENT MAPPING ON AN ELECTRONIC DEVICE

(71) Applicant: Google Inc., Mountain View, CA (US)

(72) Inventors: Esha Nerurkar, Sunnyvale, CA (US);
Joel Hesch, Mountain View, CA (US);
Simon Lynen, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/823,283

(22) Filed: Aug. 11, 2015

(65) Prior Publication Data
US 2017/0046594 A1 Feb. 16, 2017

(51) Int. Cl.
| G06K 9/46 | (2006.01) |
| --- | --- |
| G06K 9/62 | (2006.01) |
| G05D 1/02 | (2006.01) |
| G06F 17/30 | (2006.01) |
| G06F 3/01 | (2006.01) |
| G06T 7/70 | (2017.01) |
| G06T 7/73 | (2017.01) |

(52) U.S. Cl.
CPC ......... *G06K 9/6212* (2013.01); *G05D 1/0268* (2013.01); *G06F 3/011* (2013.01); *G06F 17/30247* (2013.01); *G06F 17/30265* (2013.01); *G06K 9/46* (2013.01); *G06K 9/6267* (2013.01); *G06T 7/70* (2017.01); *G06T 7/73* (2017.01)

(58) Field of Classification Search
None
See application file for complete search history.

(56) References Cited

U.S. PATENT DOCUMENTS

| 7,015,831 | B2* | 3/2006 | Karlsson | G01C 21/12 318/568.11 |
| --- | --- | --- | --- | --- |
| 2005/0126021 | A1 | 6/2005 | Robb et al. | |
| 2008/0062149 | A1 | 3/2008 | Baruk | |
| 2010/0026844 | A1 | 2/2010 | Hopkins | |
| 2013/0237811 | A1 | 9/2013 | Mihailescu et al. | |
| 2014/0119598 | A1* | 5/2014 | Ramachandran | G06T 11/60 382/103 |
| 2014/0341465 | A1 | 11/2014 | Li et al. | |
| 2015/0043784 | A1 | 2/2015 | Flint et al. | |
| 2016/0086385 | A1* | 3/2016 | Gourlay | G06T 19/20 382/154 |

(Continued)

OTHER PUBLICATIONS

E. H. Andelson et al., "Pyramid Methods in Image Processing", RCA Engineer, Nov. 12, 1984, 9 pages.

(Continued)

*Primary Examiner* — Brian Werner (57) ABSTRACT

An electronic device reduces localization data based on feature characteristics identified from the data. Based on the feature characteristics, a quality value can be assigned to each identified feature, indicating the likelihood that the data associated with the feature will be useful in mapping a local environment of the electronic device. The localization data is reduced by removing data associated with features have a low quality value, and the reduced localization data is used to map the local environment of the device by locating features identified from the reduced localization data in a frame of reference for the electronic device.

20 Claims, 5 Drawing Sheets

(56) References Cited

U.S. PATENT DOCUMENTS

2016/0283804 A1\* 9/2016 Furman .............. G06K 9/00805

OTHER PUBLICATIONS

Mahmoudreza Ahmadi et al., "Reducing the Size of Very Large Training Set for Support Vector Machine Classification", International Journal of Soft Computing and Engineering (IJSCE), Nov. 1, 2014, 7 pages.
Abdul Waheed Malik et al., "Comparison of Three Smart Camera Architectures for Real-Time Machine Vision System", International Journal of Advanced Robotic Systems, Sep. 20, 2013, 12 pages.
International Search Report and Written Opinion Correlating to PCT/US2016/046294 dated Oct. 20, 2016, 14 pages.
W. T. Fong et al.: "Computer Vision Centric Hybrid Tracking for Augmented Reality in Outdoor Urban Environments", Proceedings of the 8th International Conference on Virtual Reality Continuum and Its Applications in Industry, VRCAI 09, Jan. 1, 2009, p. 185.

\* cited by examiner

| FEATURE NAME 451 | NUMBER OF FEATURE OBSERVATIONS 454 | FEATURE DYNAMIC SCORE 457 | |
|---|---|---|---|
| FEATURE TYPE 452 | FEATURE DISTANCE 455 | FEATURE SCENE VARIABILITY 458 | |
| FEATURE LOCATION 453 | FEATURE LOCATION VARIABILITY 456 | | FEATURE DESCRIPTOR 450 |

MANAGING FEATURE DATA FOR ENVIRONMENT MAPPING ON AN ELECTRONIC DEVICE

FIELD OF THE DISCLOSURE

The present disclosure relates generally to imagery capture and processing and more particularly to managing localization data at an electronic device.

BACKGROUND

Implementation of machine vision at a mobile device can support a variety of applications enables simultaneous localization and mapping (SLAM), which in turn can support a variety of applications, such as augmented reality (AR) applications and virtual reality (VR) applications, by enabling identification of objects within the local environment of a device through the analysis of imagery of the local environment captured by the device and through correlating pose information for the mobile device with the identified objects. To support these features, the mobile device can collect a wide variety of data, including by capturing imagery at one or more image sensors and by receiving data from a variety of non-visual sensors (e.g., accelerometers and gyroscopes). However, the density and size of the collected information can slow down the identification of objects as well as negatively impact the storage resources of the mobile device.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-7 illustrate various techniques for reducing localization data at an electronic device based on characteristics of features identified from the data. Based on the feature characteristics, a quality value can be assigned to each identified feature, indicating the likelihood that the data associated with the feature will be useful in mapping a local environment of the electronic device. The localization data is reduced by removing data associated with features have a low quality value, and the reduced localization data is used to map the local environment of the electronic device by locating features identified from the reduced localization data in a frame of reference for the electronic device. By reducing the localization data in this way, the size of one or more data files storing the localization data is reduced while maintaining the overall quality of the localization data. The reduced localization data therefore supports high-quality mapping of the local environment while reducing the impact of mapping on resources of the electronic device, including storage space and processing resources.

The quality value of a feature can be identified based on any of a variety of factors, or any combination thereof, including a number of observations of the feature across different captured images, a number of different angles from which the feature was captured across different images, a consistency of position of the feature across different captured images, a dynamic characteristic of the feature (indicating, for example, whether the feature frequently disappears or moves out of the environment being mapped), a distance of the feature from the electronic device in one or more of the captured images, and the like. Prior to or after identifying and removing from the localization data those features associated with low quality values, the electronic device can take further steps to reduce the size of the localization data. Examples of such steps include removing non-visual sensor data from the localization data, identifying keyframes from the localization data and removing data that is not associated with the keyframes, geometrically compressing multiple features into a smaller subset of features, and the like. The electronic device can thereby substantially reduce the size of the localization data, improving the efficiency of the mapping process supported by the localization data.

Figure 1:
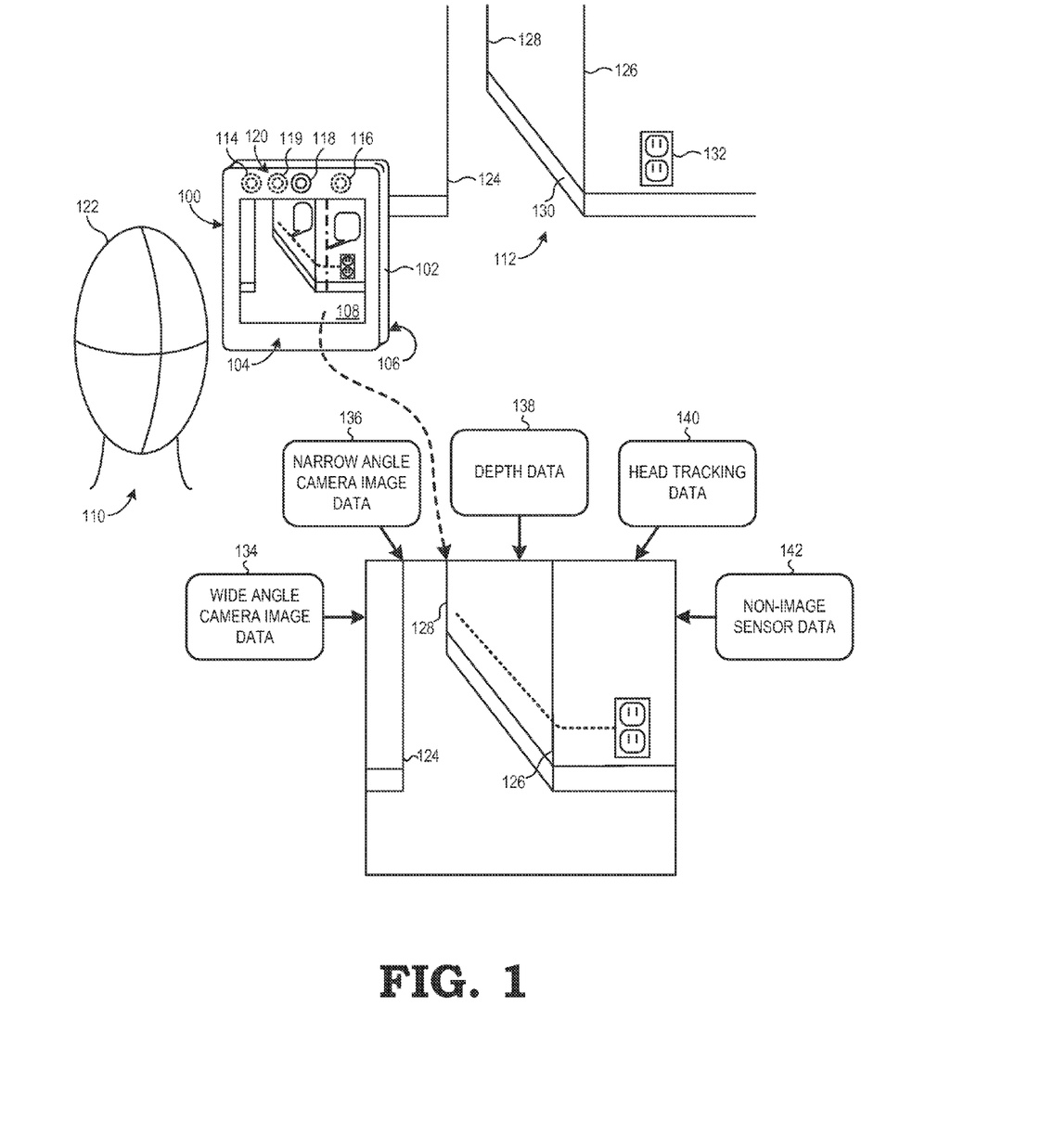
FIG. 1 is a diagram illustrating an electronic device configured to reduce localization data based on characteristics of features identified from the data in accordance with at least one embodiment of the present disclosure.

FIG. 1 illustrates an electronic device 100 configured to support location-based functionality, such as SLAM, VR, or AR, using image and non-visual sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as an automobile, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging sensors 114 and 116 and a depth sensor 120 disposed at the forward-facing surface 106 and an imaging sensor 118 disposed at the user-facing surface 104. In one embodiment, the imaging sensor 114 is implemented as a wide-angle imaging sensor having a fish-eye lens or other wide-angle lens to provide a wider angle view of the local environment 112 facing the surface 106. The imaging sensor 116 is implemented as a narrow-angle imaging sensor having a typical angle of view lens to provide a narrower angle view of the local environment 112 facing the surface 106. Accordingly, the imaging sensor 114 and the imaging sensor 116 are also referred to herein as the "wide-angle imaging sensor 114" and the "narrow-angle imaging sensor 116," respectively. As described in greater detail below, the wide-angle imaging sensor 114 and the narrow-angle imaging sensor 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via image analysis. The imaging sensor 118 can be used to capture image data for the local environment 112 facing the surface 104. Further, in some embodiments, the imaging sensor 118 is configured for tracking the movements of the head 122 or for facial recognition, and thus providing head tracking information that may be used to adjust a view perspective of imagery presented via the display 108.

The depth sensor 120, in one embodiment, uses a modulated light projector 119 to project modulated light patterns from the forward-facing surface 106 into the local environment, and uses one or both of imaging sensors 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis (e.g., stereoscopic analysis) of the image data captured by the imaging sensors 114 and 116. Alternatively, the depth data from the depth sensor 120 may be used in place of depth information obtained from image analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-visual pose information for pose detection. This non-visual pose information can be obtained by the electronic device 100 via one or more non-visual sensors (not shown in FIG. 1), such as an IMU including one or more gyroscopes, magnetometers, and accelerometers. In at least one embodiment, the IMU can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-visual sensors can also include ambient light sensors and location sensors, such as GPS sensors, or other sensors that can be used to identify a location of the electronic device 100, such as one or more wireless radios, cellular radios, and the like.

In operation, the electronic device 100 uses the image sensor data and the non-visual sensor data to estimate a pose of the electronic device 100. In at least one embodiment, after a reset the electronic device 100 determines an initial pose based on geolocation data, other non-visual sensor data, visual sensor data as described further below, or a combination thereof. As the pose of the electronic device 100 changes, the non-visual sensors generate, at a relatively high rate, non-visual pose information reflecting the changes in the device pose. Concurrently, the visual sensors capture images that also reflect device pose changes. Based on this non-visual and visual pose information, the electronic device 100 updates the initial pose to reflect a current pose of the device.

The electronic device 100 generates visual pose information based on the detection of spatial features in image data captured by one or more of the imaging sensors 114, 116, and 118. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging sensors 114 and 116 capture wide angle imaging sensor image data 134 and narrow angle imaging sensor image data 136, respectively, that includes these spatial features of the hallway. In this example, the depth sensor 120 also captures depth data 138 that reflects the relative distances of these spatial features relative to the current pose of the electronic device 100. Further, the user-facing imaging sensor 118 captures image data representing head tracking data 140 for the current pose of the head 122 of the user 110. Non-visual sensor data 142, such as readings from the IMU, also is collected by the electronic device 100 in its current pose.

From this input data, the electronic device 100 can determine an estimate of its relative pose without explicit absolute localization information from an external source. To illustrate, the electronic device 100 can perform analysis of the wide angle imaging sensor image data 134 and the narrow angle imaging sensor image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in pose of the electronic device 100 in a free frame of reference. In this approach, certain non-visual sensor data, such as gyroscopic data or accelerometer data, can be used to correlate spatial features observed in one image with spatial features observed in a subsequent image.

In at least one embodiment, the electronic device 100 uses the image data and the non-visual data to generate feature descriptors for the spatial features identified in the captured imagery. Each of the generated feature descriptors describes the orientation, gravity direction, scale, and other aspects of one or more of the identified spatial features. The generated feature descriptors are compared to a set of stored descriptors (referred to for purposes of description as "known feature descriptors") that each identifies previously identified spatial features and their corresponding poses. In at least one embodiment, each of the known feature descriptors is a descriptor that has previously been generated, and its pose definitively established, by either the electronic device 100 or another electronic device. The known feature descriptors can be stored at the electronic device 100, at a remote server or other storage device, or a combination thereof. Accordingly, the comparison of the generated feature descriptors can be performed at the electronic device 100, at the remote server or other device, or a combination thereof.

In at least one embodiment a generated feature descriptor is compared to a known feature descriptor by comparing each aspect of the generated feature descriptor (e.g. the orientation of the corresponding feature, the scale of the corresponding feature, and the like) to the corresponding aspect of the known feature descriptor and determining an error value indicating the variance between the compared features. Thus, for example, if the orientation of feature in the generated feature descriptor is identified by a vector A, and the orientation of the feature in the known feature descriptor is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the pose (e.g., the orientation or point of view) of the corresponding spatial feature. Thus, a known feature descriptor can include pose information indicating the location of the spatial feature within a specified coordinate system (e.g. a geographic coordinate system representing Earth) within a specified resolution (e.g. 1 cm), the orientation of the point of view of the spatial feature, the distance of the point of view from the feature and the like. The generated feature descriptors are compared to the known feature descriptors to identify one or more matched known feature descriptors. The matched known feature descriptors are then stored together with non-visual pose data as localization data that can be used both to identify a pose of the electronic device 100 and to map a local environment for the electronic device 100.

In some scenarios, the matching process will identify multiple known feature descriptors that match corresponding generated feature descriptors, thus indicating that there are multiple features in the local environment of the electronic device 100 that have previously been identified. The corresponding poses of the matching known feature descriptors may vary, indicating that the electronic device 100 is not in a particular one of the poses indicated by the matching known feature descriptors. Accordingly, the electronic device 100 may refine its estimated pose by interpolating its pose between the poses indicated by the matching known feature descriptors using conventional interpolation techniques.

In at least one embodiment, the electronic device 100 reduces the localization data, based on the quality of features identified reflected in the data. As described further herein, the electronic device 100 can generate a quality value for each identified feature based on a variety of factors, including a number of observations of the feature across images, consistency of the feature position in different images, distance of the feature from the electronic device 100 when one or more of the associated images was captured, and the like, or a combination thereof. The electronic device 100 also identifies a quality value threshold (QVT). In at least one embodiment, the QVT is a fixed stored value supplied by a user, designer, or manufacturer of the electronic device 100. In another embodiment, the QVT is derived from a combination of the generated quality values for the features. For example, the QVT can be an average of the quality values, a median of the quality values, or a value based on a number of quality values that exceed the QVT. The electronic device 100 reduces the localization data by removing data associated with features having a quality value below the QVT. This ensures those higher-quality features, or those features that are more likely to support effective and accurate mapping of the local environment, are preserved while reducing the size of the localization data.

In addition to reducing the localization data based on feature characteristics and associated quality values, the electronic device 100 can reduce the localization data by, for example, removing from the localization data any non-visual sensor information, as such information is not likely to support mapping of the local environment. In addition, the electronic device 100 can reduce the localization data by identifying keyframes, and removing data associated with frames other than the keyframes. For example, the electronic device 100 may identify selected captured images as keyframes, wherein the keyframe images are selected based on an identified quality of the image, a number of features identified from the image, a time at which the image was taken, measured lighting conditions under which the image was taken, and the like. The electronic device 100 can then identify those features, and associated feature descriptors, that were identified from images that are not keyframe images, and remove data (including feature descriptors) corresponding to the identified features.

Further, in at least one embodiment, the electronic device 100 can reduce the localization data by geometrically compressing data for a set of features associated with individual points of a geometric shape into a smaller subset of descriptors that identify the geometric shape, rather than all of the individual points. For example, the electronic device 100 can identify a set of feature descriptors that each represent different points in a common planar surface (e.g., a tabletop), and can compress the set of feature descriptors to a single feature descriptor that identifies the boundaries of the planar surface, thereby representing the same feature of the environment with less data.

After reducing the localization data, the electronic device 100 can use the localization data to map the local environment. For example, the electronic device 100 can use the localization data to generate a map file that indicates the position of each feature included in the localization data in a frame of reference for the electronic device 100. The map file can be used to support any of a variety of location-based services. For example, in one embodiment the map file can be used to generate a virtual reality environment, or portion thereof, representing the local environment of the electronic device 100.

Figure 2:
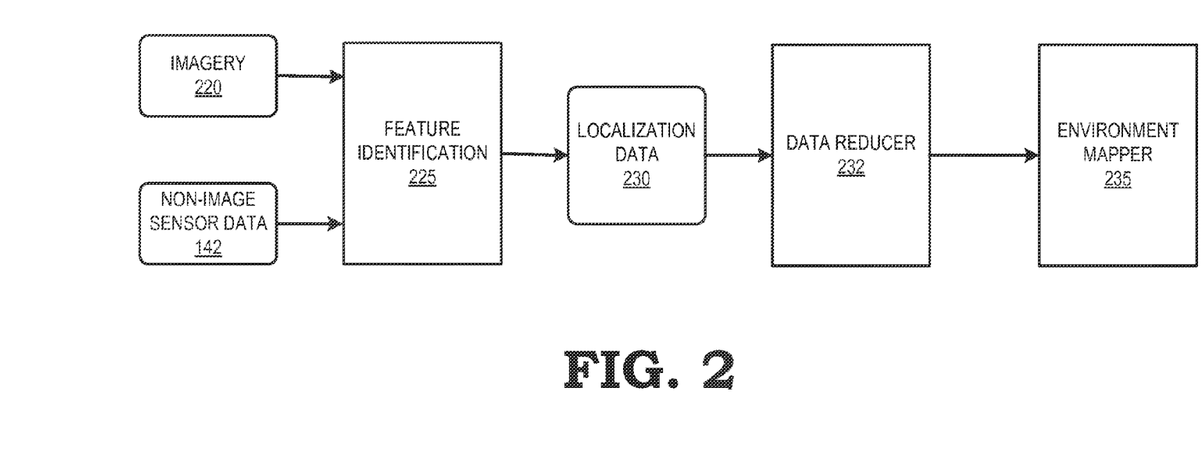
FIG. 2 is a diagram illustrating a portion of the electronic device of FIG. 1 that reduces localization data based on characteristics of features identified from the data in accordance with at least one embodiment of the present disclosure.

FIG. 2 is a block diagram of a portion of the electronic device 100 that reduces localization data based on characteristics of features identified from the data in accordance with at least one embodiment of the present disclosure. The illustrated portion includes a feature identification module 225, a data reducer 232, and an environment mapper 235. Each of these modules represents hardware, software, or a combination thereof, configured to execute the operations as described herein. In particular, the feature identification module 225 is configured to receive imagery 220, representing images captured by the imaging sensors 114, 116, 118, and the non-visual sensor data 142. Based on this received data, the feature identification module 225 identifies features in the imagery 220 by generating feature descriptors and comparing the feature descriptors to known feature descriptors as described above with respect to FIG. 1. The feature identification module stores the feature descriptors, together with any associated non-visual data, as localization data 230. In at least one embodiment, the localization data 230 can be used by the electronic device 100 to identify one or more poses of the electronic device 100 as it is moved through different locations and orientations in its local environment. These identified poses can be used in conjunction with previously generated and stored map information for the local environment to support or enhance location based services of the electronic device 100.

The data reducer 232 is configured to reduce the localization data 230 based on characteristics of the features included therein. In at least one embodiment, the data reducer 232 reduces the data by identifying a quality value for each feature based on one or more characteristics of the feature indicated in the corresponding feature descriptor, as described further below with respect to FIG. 4. The data reducer 232 then identifies a QVT for the features, and removes from the localization data 230 the feature descriptors for features having quality values lower than the QVT. The data reducer 232 then further reduces the localization data 230 by removing non-visual sensor data, and by performing geometric compression for the remaining feature descriptors. The data reducer 232 provides the reduced localization data to the environment mapper 235.

The environment mapper 235 is configured to generate or modify a map of the local environment of the electronic device 100 based on the reduced localization data. To wit, the environment mapper 235 analyzes the feature descriptors in the reduced localization data to identify the location of the features in a frame of reference for the electronic device 100. For example, each feature descriptor can include location data indicating a relative position of the corresponding feature from the electronic device 100. The environment mapper 235 can reconcile the relative positions of the different features to identify the location of each feature in the frame of reference, and store these locations in one or more map files. The map files can be used by location-based services of the electronic device 100 to, for example, generate a virtual reality display of the local environment.

Figure 3:
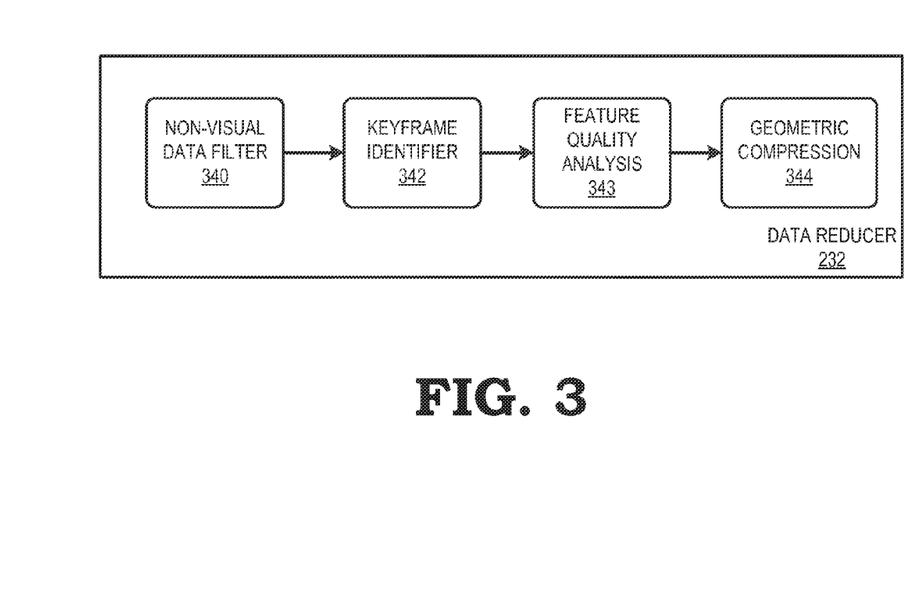
FIG. 3 is a diagram of the data reducer of FIG. 2 in accordance with at least one embodiment of the present disclosure.

FIG. 3 is a block diagram of the data reducer 232 of FIG. 2 in accordance with at least one embodiment of the present disclosure. In the illustrated example, the data reducer 232 includes a non-visual data filter 340, a keyframe identifier 342, a feature quality analysis module (FQM) 343, and a geometric compression module 344. The non-visual data filter 340 is generally configured to identify and remove from the localization data 230. For example, in at least one embodiment the non-visual data filter identifies non-visual data at the localization data 230 based on a data identifier value, based on the format of the non-visual data, based on where the non-visual data is stored, or other indicator, or a combination thereof, and then removes (e.g., deletes) the identified non-visual data from the localization data 230.

After the non-visual data has been filtered, the keyframe identifier 342 identifies keyframe of the localization data 230. For example, each feature descriptor of the localization data may include information identifying one or more images where the feature was identified. The localization data 230 can also include information indicative of the quality of each of the images, such as lighting conditions. Based on this information, the keyframe identifier 342 can identify selected images as keyframes to be used for mapping the environment. For example, in at least one embodiment the keyframe identifier 342 identifies as keyframes those images associated with greater than a threshold number of features. After identifying the keyframes, the keyframe identifier 342 can remove from the localization data 230 any feature descriptors and associated data for features that do not correspond to any keyframe, thereby reducing the localization data 230.

The FQM 343 analyzes the remaining feature descriptors to identify a quality value for each feature based on the feature characteristics indicated in the descriptor. To illustrate, in at least one embodiment, the feature descriptor indicates a number of feature characteristics, such as a number of observations of the feature in different images, a variability of location of the feature in different images, a dynamic score for the feature, and the like. The FQM 343 can generate the quality value by, for example, adding the values for each characteristic, with the quality value being equal to the sum of all the characteristics. In at least one embodiment, the quality value is a weighted sum of the values for the different characteristics, with the weights for each characteristic being identified by the FQM 343 dynamically or heuristically. It will be appreciated that these ways of identifying the quality value are examples only, and that other characteristics and formulas can be employed to identify a quality value for each feature.

The FQM 343 identifies a QVT for the localization data 230 based on a fixed threshold, a threshold set by the user of the electronic device 100 to achieve a desired performance, a dynamic threshold identified from the localization data 230 itself, and the like. The FQM 343 compares the quality value for each feature to the QVT and removes from the localization data 230 those feature descriptors having a quality value below the QVT.

The geometric compression module 344 analyzes the remaining descriptors of the localization data 230 to identify sets of individual features associated with the same geometric shape, such as a line, planar surface, polygon, three-dimensional shape, and the like. As described below with respect to the example of FIG. 5, the geometric compression module 344 replaces the feature descriptors for the individual features with a fewer number of descriptors (e.g., one feature descriptor) that describes the geometric shape. This reduces the number of descriptors stored by the localization data 230, thus further reducing the data to prepare it for analysis by the environment mapper 235.

Figure 4:
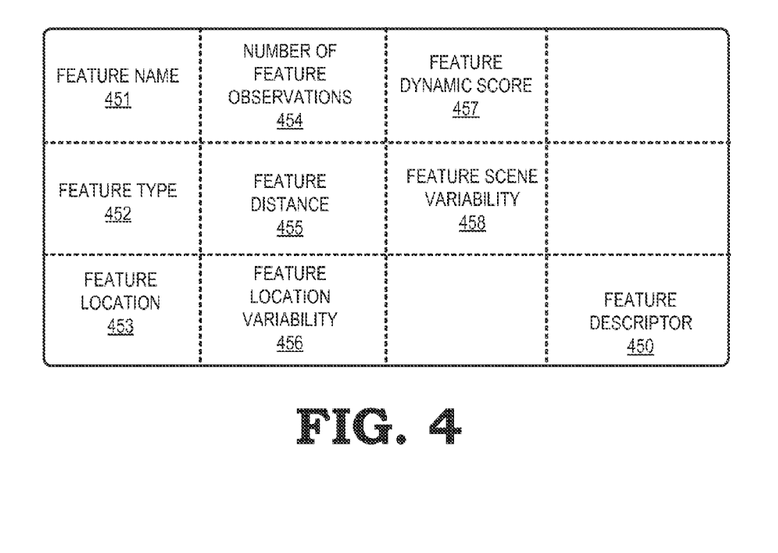
FIG. 4 is a diagram illustrating a feature descriptor that can be employed by the data reducer of FIG. 3 to identify a quality of an associated feature in accordance with at least one embodiment of the present disclosure.

FIG. 4 illustrates a feature descriptor 450 that can be stored at the localization data 230. The feature descriptor 450 includes fields 451-458, wherein each field indicates a feature characteristic for the corresponding feature. These feature characteristics can be employed by the FQM 343 to identify a quality value for the corresponding feature. To illustrate, the feature name field 451 indicates a name or other identifier for the feature that can be used to differentiate it from other features. The feature type field 452 indicates a type of the feature, such as a type of geometry for the object. Thus, the feature type field 452 could indicate that the corresponding feature is a point, a corner, a planar surface, a polygon, and the like.

The feature location field 453 indicates position data for the corresponding feature, such as coordinate data indicating the location of the feature in a frame of reference relative to a pose of the electronic device 100. In at least one embodiment, the FQM 343 can use the information in the feature location field 453 to modify the quality value for the feature. For example, in some scenarios the electronic device 100 may determine that features at particular locations, or ranges of locations, such as near the edges of a field of vision of the electronic device 100, are likely to be less reliably identified. Accordingly, the FQM 343 can lower the quality value for features at such locations, or within such location ranges.

The number of feature observations field 454 indicates a number of different images from which the feature was identified. For example, the electronic device 100 may capture multiple images of a given feature as the device is moved through different poses. When the feature identification module 225 (FIG. 2) generates the feature descriptor for the feature, it can identify the number of different images that include the feature, and the number of different angles from which the images of the feature were taken. In at least one embodiment, a higher number of images, or a higher number of different angles from which a feature was observed, increases the likelihood that the feature was correctly identified by the feature identification module 225. Accordingly, as the value of the number of feature observation fields 454 increases, the FQM 343 increases the quality value for the corresponding feature.

The feature distance field 455 indicates a distance of the corresponding feature from the electronic device 100 when the feature was captured in one or more images. If the feature was captured in multiple images, the feature distance field 455 can be an average of the corresponding distances, a maximum of the corresponding distances, a minimum of the corresponding distances, or other selection or combination of the corresponding distances. In some scenarios, a larger distance to a feature corresponds to less reliable identification of the feature. Accordingly, for larger values of the feature distance field 455 the FQM 343 increases the quality value for the corresponding feature.

The feature location variability field 456 stores a value indicating an amount of variability in the location of the corresponding feature across different images from which the feature was identified. For example, the electronic device 100 may capture multiple images of a given feature as the device is moved through different poses. When the feature identification module 225 (FIG. 2) generates the feature descriptor for the feature, it can identify, for each image, a position of the feature in a frame of reference, then identify a variability between the identified positions. For example, the variability may be indicated by identifying a standard deviation of the identified positions. In at least one embodiment, the higher the variability the less likely that the feature descriptor correctly identifies the characteristics of the corresponding feature. Accordingly, as the value of the feature location variability field 456 increases, the FQM 343 decreases the quality value for the corresponding feature.

The feature dynamic score field 457 indicates a dynamic characteristic of the corresponding feature. The dynamic characteristic is an indication of how long the feature is expected to persist in a given location relative to the electronic device 100. A higher value of the dynamic score field 457 indicates that the corresponding feature is highly dynamic, and therefore highly likely to change positions. Examples of highly dynamic features may include features corresponding to or associated with people, animals, moving vehicles, and the like. In at least one embodiment, the electronic device 100 can identify the dynamic score for a feature based on a number of factors, including identifying changes in position of the feature across images, information provided in a known feature descriptor for the feature, and the like. In at least one embodiment, the higher the value of the dynamic score field, the less likely that the feature descriptor will be useful in mapping the local environment, because of the higher likelihood that the feature will have changed position, or even exited the local environment, when the map of the local environment is generated. Accordingly, as the value of the feature location variability field 456 increases, the FQM 343 decreases the quality value for the corresponding feature.

The feature scene variability field 458 indicates a variability of features identified in the same image as the feature corresponding to the feature descriptor 450. In at least one embodiment, the electronic device 100 can identify the scene variability by identifying the number of different features identified from each captured image, and determining a variation in this number for the images in which a given feature is identified. In at least one embodiment, the higher the value of the scene variability field 458, the less likely that the feature descriptor will be useful in mapping the local environment, because of the higher likelihood that the feature is part of a quickly varying environment. Accordingly, as the value of the feature location variability field 456 increases, the FQM 343 decreases the quality value for the corresponding feature.

Figure 5:
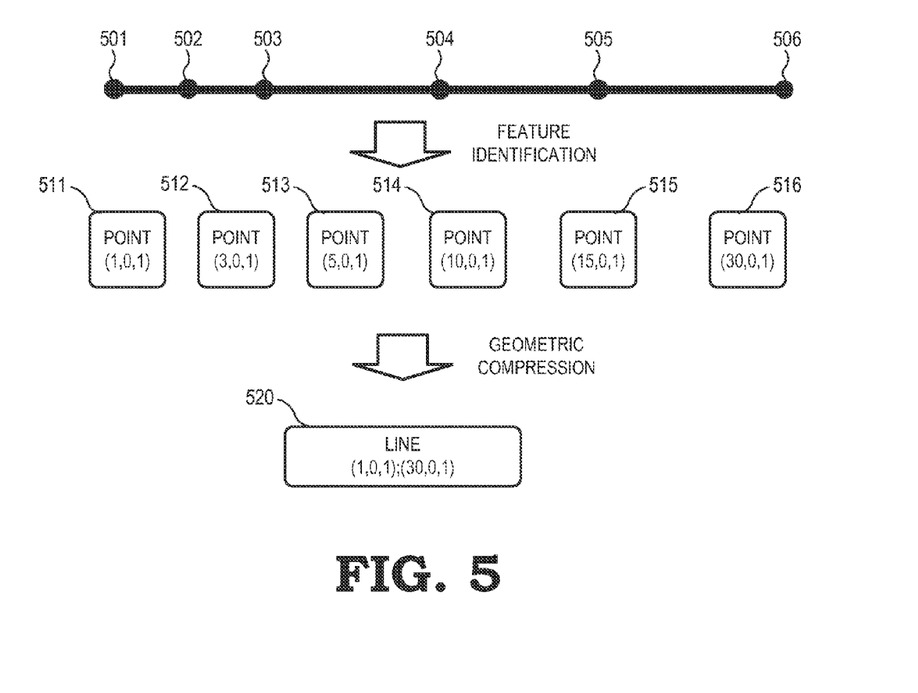
FIG. 5 is a diagram illustrating an example of geographic compression at the data reducer of FIG. 3 in accordance with at least one embodiment of the present disclosure.

FIG. 5 is a diagram illustrating an example operation of the geometric compression module 344 of FIG. 3 in accordance with at least one embodiment of the present disclosure. In the depicted example, features 501, 502, 503, 504, and 506 lie along the same line in a local environment of the electronic device 100. Thus, for example, features 501-506 may collectively represent the edge of a table, door, or other object in the local environment. As the electronic device 100 is moved through and around the local environment, it captures imagery including the features 501-506. Based on this imagery, the feature identification module 225 generates feature descriptors 511, 512, 513, 514, and 516, each describing a different corresponding feature (i.e., descriptor 511 describes feature 501, descriptor 512 describes feature 502, and so on). In the depicted example, each of the feature descriptors 501-506 includes the coordinates of the corresponding feature in a frame of reference of the electronic device 100. The geometric compression module 344 analyzes the feature descriptors 501-506, as stored in the localization data 230, and determines, based on the coordinates of each feature and the indication that each of the features is a point feature, that the feature descriptors 501-506 represent a set of points along a line. In response, the geometric compression module 344 replaces the feature descriptors 501-506 with a feature descriptor 520 that describes a line having endpoints corresponding to the features 501 and 506. The geometric compression module 344 thus replaces multiple feature descriptors that collectively describe different aspects of a geometric shape with a single feature descriptor for the geometric shape. In at least one embodiment, the single feature descriptor is smaller, from a memory storage standpoint, than the multiple feature descriptors together. Thus, feature descriptor 520 occupies less storage space than the feature descriptors 501-506 together. Accordingly, by replacing the feature descriptors 501-506 with the feature descriptor 520, the geometric compression module reduces the localization data 230. It will be appreciated that FIG. 5 depicts just one example of geometric compression, and that in some embodiments the geometric compression module can identify and compress feature descriptors for more complex shapes, including polygons and 3-dimensional shapes.

Figure 6:
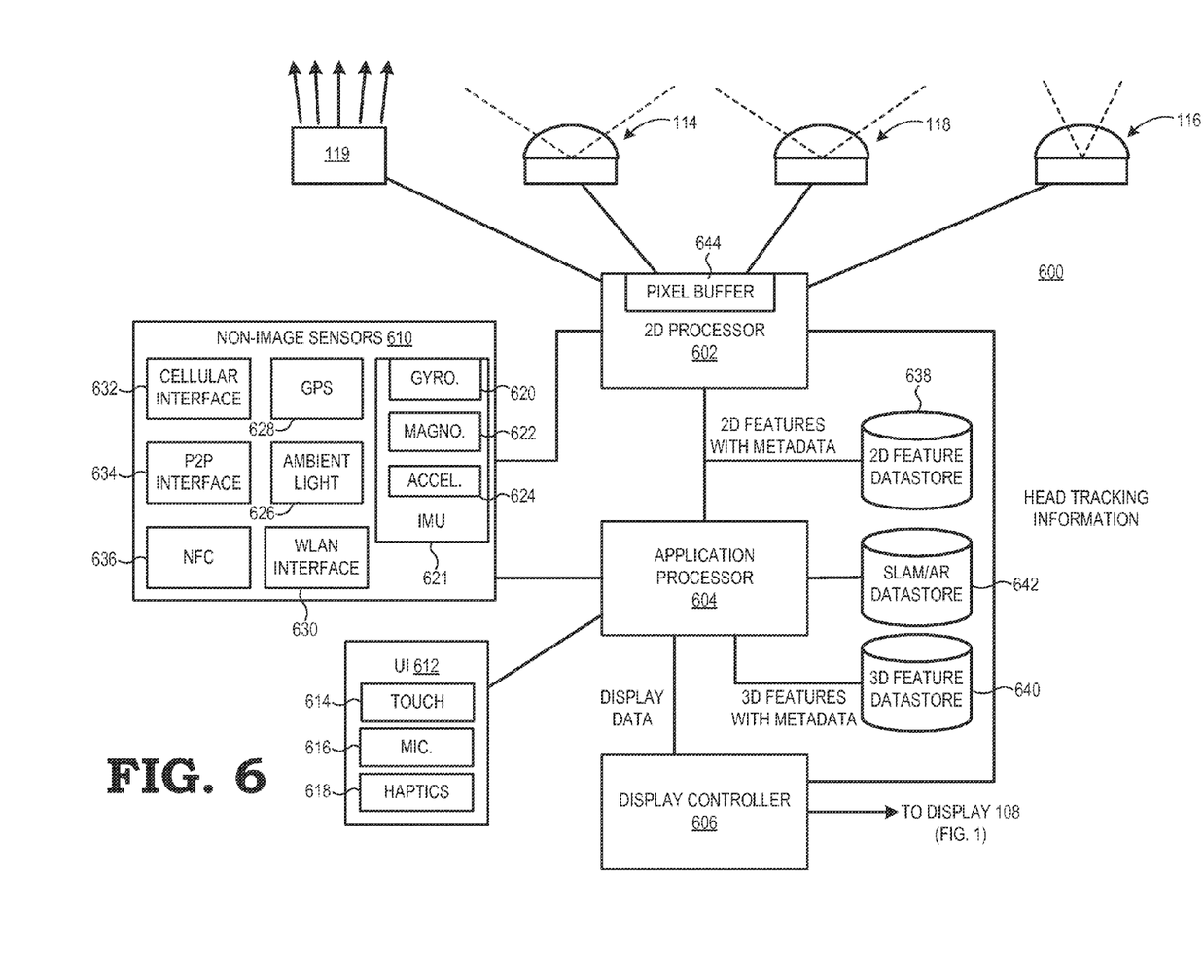
FIG. 6 is a block diagram illustrating a processing system of an electronic device in accordance with at least one embodiment of the present disclosure.

FIG. 6 illustrates an example processing system 600 implemented by the electronic device 100 in accordance with at least one embodiment of the present disclosure. The processing system 600 includes the wide-angle imaging sensor 114, the narrow-angle imaging sensor 116, the user-facing imaging sensor 118, and the depth sensor 120. The processing system 600 further includes a 2D processor 602, an application processor 604, a display controller 606, a set 610 of non-visual sensors, and a user interface 612.

The user interface 612 includes one or more components manipulated by the user to provide user input to the electronic device 100, such as a touchscreen 614, a mouse, a keyboard, a microphone 616, various buttons or switches, and various haptic actuators 618. The set 610 of non-visual sensors can include any of a variety of sensors used to provide non-visual context or state of the electronic device 100. Examples of such sensors include an IMU 621 including a gyroscope 620, a magnetometer 622, and an accelerometer 624, and an ambient light sensor 626. The non-visual sensors further can include various wireless reception or transmission based sensors, such as a GPS receiver 628, a wireless local area network (WLAN) interface 630, a cellular interface 632, a peer-to-peer (P2P) wireless interface 634, and a near field communications (NFC) interface 636.

The electronic device 100 further has access to various datastores storing information or metadata used in conjunction with its image processing, location mapping, and location-utilization processes. These datastores can include a 2D feature datastore 638 to store metadata for 2D spatial features identified from imagery captured by the imaging sensors of the electronic device 100 and a 3D spatial feature datastore 640 to store metadata for 3D features identified from depth sensing for the 2D spatial features using analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-visual sensor data that was contemporaneously with the image containing the identified spatial feature, such as GPS, Wi-Fi, or other radio information, time-of-day information, weather condition information (which affects the lighting), and the like. The datastores further can include a SLAM/AR datastore 642 that stores SLAM-based information, such as mapping information for areas of the local environment 112 (FIG. 1) already explored by the electronic device 100, or AR information, such as CAD-based representations of the relative locations of objects of interest in the local environment 112. The datastores 638 and 640 can also store known feature descriptors and feature descriptors generated based on imagery captured at the electronic device 100. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 600 employs two processors: the 2D processor 602 configured to efficiently identify 2D spatial features from visible-light imagery and depth sensor imagery captured by the imaging sensors of the electronic device 100; and the application processor 604 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 602 and the application processor 604 may be implemented in a single processor, or more than two processors together may implement the described functionality. The 2D processor 602 can be implemented as, for example, a single-core or multiple-core graphics processing unit (GPU) and the application processor 604 can be implemented as, for example, a GPU or a single-core or multiple-core central processing unit (CPU).

The 2D processor 602 is coupled to the wide-angle imaging sensor 114, the narrow-angle imaging sensor 116, and the user-facing imaging sensor 118 so as to receive image data captured by the imaging sensors in one or more pixel row buffers 644. In one embodiment, the 2D processor 602 includes an interface and a pixel row buffer 644 for each imaging sensor so as to be able to receive image data from each imaging sensor in parallel. In another embodiment, the 2D processor 602 includes a single interface and a pixel row buffer 644 and thus the 2D processor 602 multiplexes between the imaging sensors.

The 2D processor 602 is configured to process the captured image data from the imaging sensors to identify 2D spatial features present in the image data. In some embodiments, the 2D processor 602 implements a hardware configuration specifically designed for this task. In other embodiments, the 2D processor 602 includes a more general processor architecture that provides the 2D spatial feature detection through execution of a software program configured to implement the 2D spatial feature detection process. The 2D processor 602 also may implement a combination of specialized hardware and specialized software for this purpose. As described above, any of a variety of well-known 2D spatial feature detection or extraction algorithms may be implemented by the 2D processor 602. The 2D processor 602 stores metadata and other information pertaining to the identified 2D spatial features to the 2D feature datastore 638.

The 2D processor 602, in one embodiment, is configured to analyze imagery captured by the user-facing imaging sensor 118 to track the current pose (e.g., the current location) of the user's head using any of a variety of well-known head tracking algorithms. In the depicted example, the 2D processor 602 provides the head tracking information to the display controller 606, which in turn is configured to adjust the displayed imagery to react to changes in the user's view perspective as reflected in changes in pose of the user's head. In another embodiment, the 2D processor 602 provides the head tracking information to the application processor 604, which in turn modifies the display data to reflect updated view perspectives before the display data is provided to the display controller 606.

The 2D processor 602 also acts as a controller that operates the modulated light projector 119 in its use in determining depth data for spatial features identified in the captured imagery of the local environment 112. In certain conditions, such as relatively bright settings (as sensed using the ambient light sensor 626), the 2D processor 602 may use image analysis of imagery concurrently captured by the wide-angle imaging sensor 114 and the narrow-angle imaging sensor 116 to determine depth data for spatial features present in the captured imagery. In other conditions, such as relatively low lighting conditions, the 2D processor 602 may switch to the use of the depth sensor 120 (FIG. 1) to determine this depth data. In other embodiments, the processing system 600 implements a controller (not shown) separate from the 2D processor 602 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging sensors. Thus, the 2D processor 602 may use one or both of the forward-facing imaging sensors 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 602 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 602 can capture a visible-light image, and quickly thereafter control the modulated light projector 119 to project a modulated light pattern and capture a reflected modulated light image. The 2D processor 602 then can develop a depth map for the visible-light image from the reflected modulated light image as they effectively represent the same scene with the same spatial features at the same coordinates due to the contemporaneous capture of the visible-light image and the reflected modulated light image.

The application processor 604 is configured to implement the feature identification module 225 (FIG. 2) to identify spatial features represented in the captured imagery using the 2D spatial features represented in the 2D feature datastore 638 and using non-visual sensor information from the set 610 of non-visual sensors. As with the 2D processor 602, the application processor 604 may be configured to perform this process through a specialized hardware configuration, through execution of software configured for this process, or a combination of specialized hardware and software. Metadata and other information for the identified 3D spatial features are stored in the 3D feature datastore 640. In at least one embodiment, the application processor 604 implements (e.g., executes instructions that, when executed, manipulate the application processor 604 to perform the operations of) the data reducer 232 (FIG. 2). Thus, the application processor 604 can identify characteristics of the identified features and reduce the localization data 230 based on these characteristics as described above.

The application processor 604 further is configured to provide SLAM, AR, VR, and other location-based functionality using 3D spatial features represented in the 3D feature datastore 640 and using the current context of the electronic device 100 as represented by non-visual sensor data. The current context can include explicit or implicit user input obtained from, for example, the user interface 612 or via an analysis of user interactions. Similarly, the application processor 604 can use a history of positions/orientations of the electronic device 100 and a history of spatial features observed in those positions/orientations to create a map of the local environment 112 based on the reduced localization data.

The location-based functionality provided by the application processor 604 further can include AR-related or VR-related functionality that includes identifying and accessing from the SLAM/AR datastore 642 graphical information to be provided as a graphical overlay on the display 108 based on the current pose determined by the application processor 604. This graphical overlay can be provided in association with imagery captured by the imaging sensors in the current pose for display at the display 108 via the display controller 606. The display controller 606 operates to control the display 108 (FIG. 1) to display imagery represented by display data received from the application processor 604. Further, in some embodiments, the display controller 606 can receive head tracking information from the 2D processor 602 and adjust the view perspective of the imagery being displayed based on the user head position or eye position represented in the received head tracking information.

Figure 7:
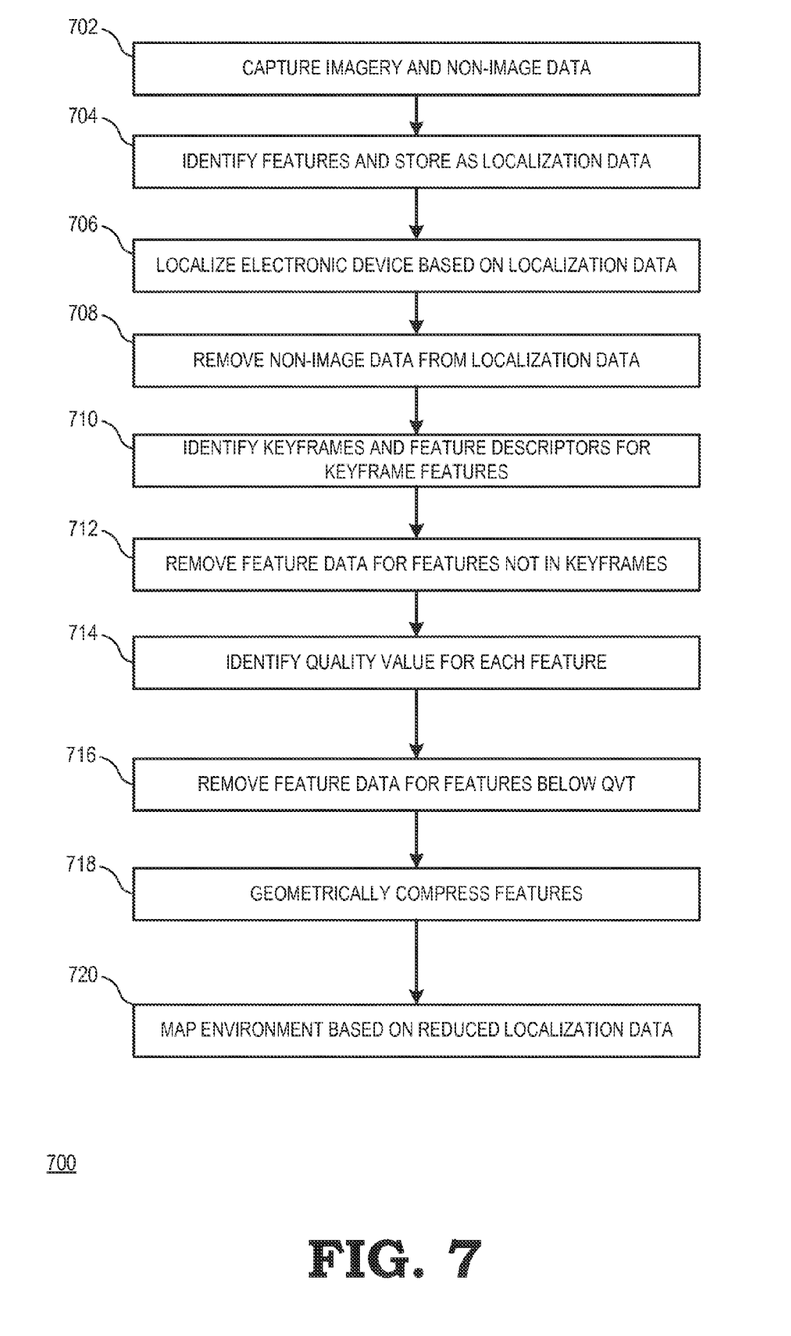
FIG. 7 is a flow diagram illustrating an operation of an electronic device to reduce localization data based on feature quality in accordance with at least one embodiment of the present disclosure.

FIG. 7 illustrates a flow diagram of a method 700 of reducing localization at the electronic device 100 in accordance with at least one embodiment of the present disclosure. The method 700 initiates at block 702, where the electronic device 100 captures imagery and non-visual data as it is moved by a user through different poses in a local environment. At block 704, the feature identification module 225 identifies features of the local environment based on the imagery and non-visual data, and stores feature descriptors for the identified features at the localization data 230. At block 706, the electronic device 100 uses the localization data 230 to identify one or more poses of the electronic device 100 in the local environment. The identified poses can be used to support location-based functionality for the electronic device 100. For example, the identified poses can be used to orient a user of the electronic device 100 in a virtual reality or augmented reality application executed at the electronic device 100.

At block 708, the data reducer 232 initiates reduction of the localization data 230 by employing the non-visual data filter 340 to remove data collected from the non-visual sensors of the electronic device 100. At block 710, the keyframe identifier 342 identifies keyframes of the localization data 230 and at block 712 removes from the localization data 230 the feature descriptors for features not associated with a keyframe. Proceeding to block 714, the feature quality analysis module 343 analyzes the remaining feature descriptors of the localization data 230 to generate a quality value for each feature. At block 716 the feature quality analysis module removes from the localization data 230 the feature descriptors for those features having a quality value below the QVT. Proceeding to block 718, the geometric compression module 344 analyzes the remaining feature descriptors of the localization data 230 and, based on the analysis, geometrically compress sets of feature descriptors as described above, thereby further reducing the localization data 230. At block 720, the environment mapper 235 uses the reduced localization data 230 to generate and store a map of the local environment of the electronic device 100 for use by location-based services of the device.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
generating, at an electronic device, localization data for the electronic device based on imagery captured at the electronic device and based on received non-visual pose information obtained from non-visual sensors;
identifying a plurality of features of an environment of the electronic device based on the captured imagery, at least one image of the captured imagery comprising multiple features of the plurality of features, each feature of the plurality of features having a quality value corresponding to the feature, and wherein the multiple features of the at least one image have different quality values;
identifying a quality value threshold (QVT) for the localization data, wherein the QVT is a value derived from one of an average of quality values, a median of quality values, and a value based on a number of quality values that exceed the QVT;
reducing the localization data based on characteristics of the plurality of features and the corresponding quality value by removing data associated with features in the plurality of features having the quality value below the QVT; and
mapping the environment of the electronic device based on the reduced localization data.

2. The method of claim 1, wherein the characteristics of the plurality of features comprise at least one of a number of observations of each of the plurality of features in different images of the captured imagery and a consistency of position of each of the plurality of features in different images of the captured imagery.

3. The method of claim 1, wherein the quality value comprises a likelihood that the localization data associated with the feature will be useful in the mapping.

4. The method of claim 2, wherein the characteristics of the plurality of features further comprise one of a distance from the electronic device of each of the plurality of features in different images of the captured imagery and a variability of the plurality of features in different images of the captured imagery.

5. The method of claim 3, wherein the quality value is generated based on one or more of a number of observations of a feature across images, a consistency of the feature position in different images, and a distance of the feature from the electronic device when one or more of the associated images is captured.

6. The method of claim 1, wherein reducing the localization data further comprises removing the non-visual pose information from the data.

7. The method of claim 1, wherein reducing the localization data further comprises geometrically compressing the localization data by replacing a plurality of feature descriptors representing geometric points with a feature descriptor representing a geometric shape corresponding to the geometric points.

8. The method of claim 1, wherein reducing the localization data further comprises:
  identifying keyframes of the localization data; and
  removing data that does not correspond to a keyframe of the localization data.

9. A method, comprising,
  generating quality values for a plurality of features identified from imagery, at least one image of the imagery comprising multiple features of the plurality of features, and wherein the multiple features of the at least one image have different quality values;
  reducing, at an electronic device, localization data of the electronic device based on the generated quality values, wherein the quality values are based on one or more of a consistency of position of a feature across images, a number of observations of a feature across images, and a distance of a feature from the electronic device upon capture of associated images; and
  mapping a local environment of the electronic device based on the reduced localization data.

10. The method of claim 9, wherein reducing the localization data further comprises:
  removing non-visual sensor data from the localization data; and
  performing geometric compression by replacing a plurality of feature descriptors representing geometric points with a feature descriptor representing a geometric shape corresponding to the geometric points.

11. The method of claim 9, wherein reducing the localization data further comprises:
  identifying a quality value for each feature based on characteristics of features in the localization data, the characteristics comprising one or more of a dynamic score for a feature, a variability of location of a feature in different images, and a number of observations of a feature in different images.

12. The method of claim 9, wherein the mapping comprises:
  matching a feature from the reduced localization data to a feature descriptor of a database of feature descriptors; and
  mapping the local environment based on matching the feature.

13. An electronic device comprising:
  an imaging sensor to capture imagery;
  a plurality of non-visual sensors;
  a processor comprising:
    a feature identification module configured to:
      generate, at an electronic device, localization data for the electronic device based on based on imagery captured at the electronic device and based on received non-visual pose information obtained from non-visual sensors; and
      identify characteristics of a plurality of features of an environment of the electronic device based on the captured imagery, at least one image of the captured imagery comprising multiple features of the plurality of features, and wherein the multiple features of the at least one image have different quality values;
    a data reducer configured to identify a quality value threshold (QVT) and reduce the localization data based on removing features of the plurality of features with quality values lower that the QVT, wherein the QVT is a value derived from one of an average of the quality values, a median of the quality values, and a value based on a number of quality values that exceed the QVT; and
    an environment mapper configured to generate a map of the environment of the electronic device based on the reduced localization data.

14. The electronic device of claim 13, wherein the characteristics of the plurality of features comprise a number of observations of each of the plurality of features in different images of the captured imagery.

15. The electronic device of claim 13, wherein the characteristics of the plurality of features comprise a consistency of position of each of the plurality of features in different images of the captured imagery.

16. The electronic device of claim 13, wherein the characteristics of the plurality of features comprise a distance from the electronic device of each of the plurality of features in different images of the captured imagery.

17. The electronic device of claim 13, wherein the characteristics of the plurality of features comprise a variability of the plurality of features in different images of the captured imagery.

18. The electronic device of claim 13, wherein the data reducer is further configured to reduce the localization data by removing the non-visual pose information from the localization data and performing a geometric compression by replacing a plurality of feature descriptors representing geometric points with a feature descriptor representing a geometric shape corresponding to the geometric points.

19. The electronic device of claim 13, wherein the processor reduces the localization data further by geometrically compressing the localization data.

20. The electronic device of claim 13, wherein the processor reduces the localization data by:
  identifying keyframes of the localization data; and
  removing data that does not correspond to a keyframe of the localization data.

* * * * *